(12) United States Patent
Brown et al.

(10) Patent No.: US 6,714,827 B1
(45) Date of Patent: Mar. 30, 2004

(54) METHOD FOR SCHEDULING A PROJECT TO DESIGN AND MANUFACTURE A MULTI-COMPONENT ASSEMBLY

(75) Inventors: Timothy K Brown, Farmington Hills, MI (US); Jack E Thompson, Clarkston, MI (US); N. Ray Hedding, Waterford, MI (US); Michael A Tonietto, Tecumse (CA); James W Strausbaugh, Clarkston, MI (US); Roger P Lundberg, Plymouth, MI (US); Lawrence J Achram, Grosse Ile, MI (US); William M Russo, West Bloomfield, MI (US); Robert J Dupuis, Holly, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 205 days.

(21) Appl. No.: 09/745,075

(22) Filed: Dec. 20, 2000

Related U.S. Application Data

(60) Provisional application No. 60/172,902, filed on Dec. 21, 1999.

(51) Int. Cl.$^7$ ................................................. G06F 19/00
(52) U.S. Cl. ............................................. 700/97; 700/95
(58) Field of Search ........................... 700/97, 95, 100, 700/102, 103; 709/103

(56) References Cited

U.S. PATENT DOCUMENTS 6,233,493 B1 * 5/2001 Cherneff et al. ............... 700/95

* cited by examiner

Primary Examiner—Leo Picard
Assistant Examiner—Carlos R. Ortiz
(74) Attorney, Agent, or Firm—Ralph E. Smith

(57) ABSTRACT

A method for scheduling to design and manufacture a multi-component assembly includes identifying a project completion date, determining a tooling lead time for each of the plurality of components, determining a design completion date for each of the plurality of subassemblies, the design completion date being a function of the project completion date and the tooling lead times for each of the plurality of components, determining a design lead time for each of the plurality of components, and determining a design start date for each of the plurality of components.

7 Claims, 6 Drawing Sheets

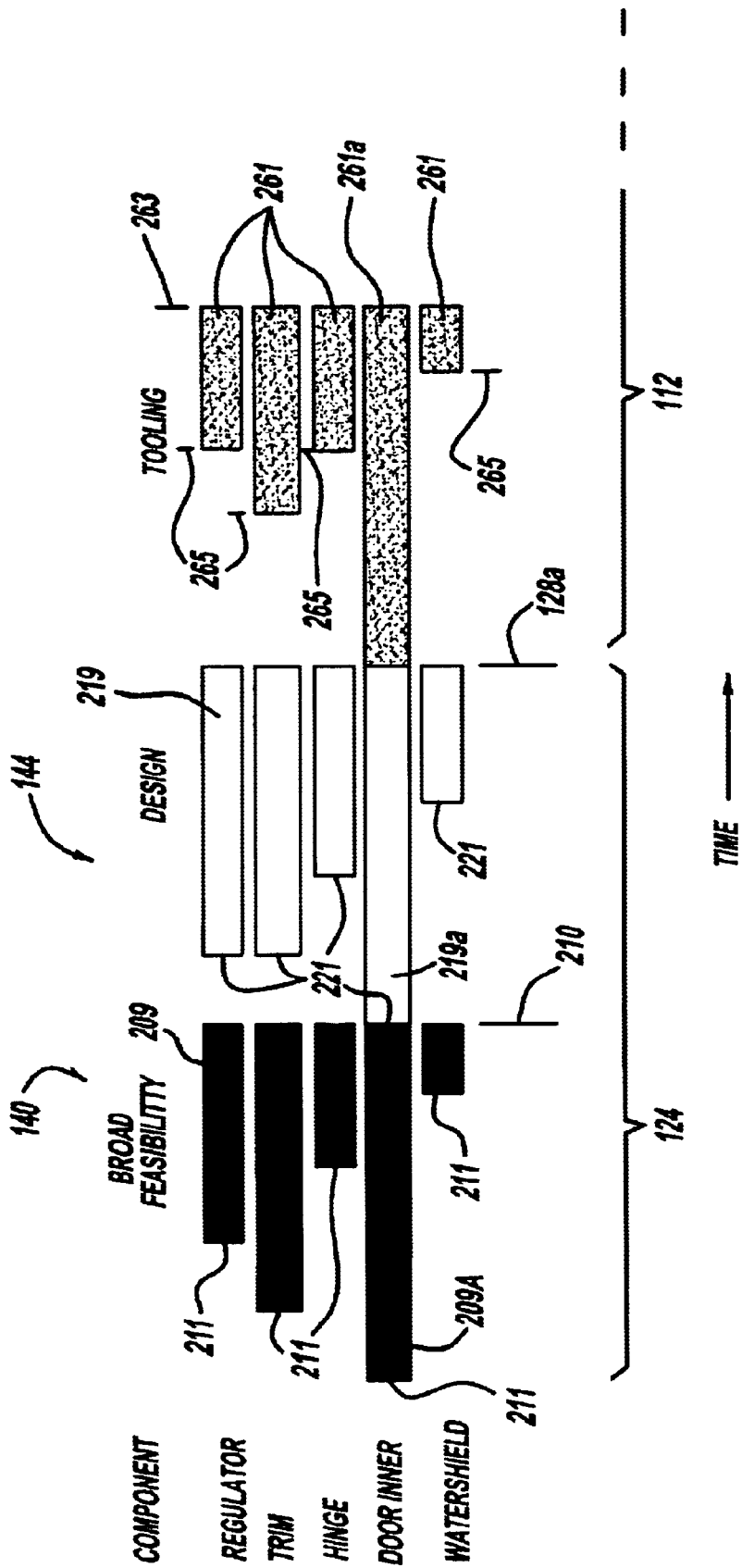

METHOD FOR SCHEDULING A PROJECT TO DESIGN AND MANUFACTURE A MULTI-COMPONENT ASSEMBLY

CROSS-REFERENCE TO RELATED APPLICATION

This application claims the benefit of U.S. Provisional Application No. 60/172,902, filed Dec. 21, 1999.

BACKGROUND OF THE INVENTION

1. Technical Field

The present invention relates generally to article development and tooling projects and more particularly to a method for scheduling the development and tooling of an article which reduces the cost and lead time of the project through the elimination or a substantial reduction in the iterative efforts associated with multiple prototype builds.

2. Discussion

In FIG. 1, a prior art system for designing and manufacturing a multi-component assembly is generally indicated by reference numeral 10. Such systems are commonly employed in the design and manufacture of automotive vehicles where the resources of many individuals with diverse backgrounds are employed to produce a desired product from a product concept in a desired time period.

System 10 is illustrated as including four distinct stages: an invention stage 12, a planning stage 14, an execution stage 16 and a launch stage 18. The invention stage 12 typically refers to the development or incorporation of a new technology or new component configuration into a product. Depending upon the new technology or complexity of the component, the invention stage may conclude fairly quickly, or may linger on until the latter stages of the project.

The planning stage 14 refers to the development of a product theme that outlines the goals and objectives of the project. This stage usually has a duration which is relatively short and tends to focus on the product at a level rarely more detailed than that of the major systems that make up the product. As such, the outcome of this stage is generally a set of systems guidelines that define the overall performance and functionality of the product.

The execution stage 16 consists of the simultaneous development of the components of the multi-component assembly. Responsibility for each component is usually delegated to a team which then sets forth designing and perhaps building and testing their component. While these teams are not truly independent, the lack of available data on the other components which make up the product significantly impairs their ability to develop their component in a timely and efficient manner.

One example is where a team is cognizant of the problems facing a team responsible for another component and commits to certain design criteria to assist the other team in mitigating those problems. Often times, these decisions are made so early in the execution stage 16 that the teams lack a complete understanding of the true magnitude of the problem. As such, attempts to mitigate a problem may simply force unnecessary engineering and development efforts, or may force a team to accept a design which meets the design criteria but does not provide a solution which completely optimizes all of the design criteria (i.e., a non-optimal solution).

Another example is where the problems of one team affect the component of another team. Such occurrences are common and not necessarily the fault of any one team, as it is often necessary to test the limits of technology to maintain a competitive edge in today's global market. Whatever the cause of these problems, the end result is the same and includes one or more teams scrambling to revise their designs and tooling to incorporate the newly discovered constraints. These efforts, while necessary under the circumstances, also negatively impact the project as they require duplicative engineering and development efforts.

Validation of the design of the entire multi-component assembly is required prior to the release of a production-ready design which is typically obtained through a pilot build. During the prototype build prototype parts for each of the components are fabricated from the preliminary designs and the components are assembled to verify their performance and function, as well as the performance and function of the multi-component assembly as a whole. As most or substantially all of the teams had developed their components without a complete understanding of the efforts of the other teams, significant redesign of numerous components is often necessary. It should be noted that the typical case is not that the component fails to perform, but rather that interaction between the various components does not produce the desired functionality, appearance or performance.

The detection of one or more problems with a component often necessitates modifications to its design. Such modifications frequently diminish the value of the validation data obtained from the initial pilot build for that component and well as the other components with which that component interacted. Even if problems had not been detected with a component, teams would frequently refine their designs to eliminate concerns as to the manufacturability, the ease of assembly or the cost of the component. The value of the validation data for these components, as well as the other components with which they interacted, is frequently diminished by such refinements. Consequently, the process of refining designs after the initial pilot build to reduce cost and optimize performance, functionality, the ease of assembly and manufacturability most often necessitated an additional pilot build so as to obtain validation data on the refined designs which was more represenative of the final design of the product and hence, more meaningful and valuable.

Depending upon the extent to which information is shared between the various teams, three or more pilot builds may be necessary before the design of all of the components can be released for production. The iterative design and development process is costly and frequently fails to optimize cost, performance, functionality, ease of assembly and manufacturability. Accordingly, the execution stage 16 frequently carries into the launch stage 18 where the transition to production manufacturing of the multi-component assembly is being made.

As the management and staff of the groups responsible for the design and development of the multi-component assembly are generally different from the management and staff of the groups responsible for the production manufacturing of the multi-component assembly, it is desired that all issues with the execution stage 16 of the project be resolved prior to or at an early stage of the launch stage 18. Also, it is desired that any issues from the invention stage 12 be resolved prior to the launch stage 18. Unfortunately, as new projects are frequently tied to new inventions, problems from the invention and execution stages 12 and 16 frequently linger into the latter stages of the launch stage 18. Scheduling of a project in this manner may impact engineering decisions relating to the design and manufacture of the product in a manner which risks the cost, timing and ability to optimize the product to the design criteria.

SUMMARY OF THE INVENTION

It is a general object of the present invention to provide a method for scheduling a multi-phase project to design and manufacture a multi-component assembly which forestalls design and tooling activity on components which are not part of the critical path of the project so as to improve the first pass yield of the project.

In one form, the present invention provides a method of scheduling a project to design and manufacture a multi-component assembly. The method includes the general steps of:

a. identifying a project completion date;
b. determining a tooling lead time for each of the plurality of components;
c. determining a common design completion date for each of the plurality of sub-assemblies, the common design completion date being a function of the project completion date and the tooling lead times for each of the plurality of components;
d. determining a design lead time for each of the plurality of components; and
e. determining a design start date for each of the plurality of components.

In another form, the present invention provides a method of scheduling the design of a motor vehicle having a plurality of sub-assemblies. The method includes:

a. identifying a project completion date;
b. inputting the projection completion date into a computer;
c. determining a tooling lead time for each of the a plurality of components;
d. inputting the tooling lead times for each of the plurality of components into the computer;
e. calculating a common design completion date with the computer for each of the plurality of sub-assemblies, the common design completion date being a function of the project completion date and the tooling lead times for each of the plurality of components;
f. determining a design lead time for each of the plurality of components;
g. inputting the design lead times for each of the plurality of components into the computer; and
h. calculating a design start date with the computer for each of the plurality of components.

In yet another form, the present invention provides a method for developing a design for a multi-component assembly, the method includes:

a. developing a preliminary design of the multi-component assembly;
b. identifying in the preliminary design a plurality of components which at least partially make up the multi-component assembly;
c. developing a computer model of each of the plurality of components;
d. developing prototype tooling for each of the plurality of components based on the computer models of each of the plurality of components;
e. producing the plurality of components from the tooling;
f. assembling the multi-component assembly; and
g. collecting verification data to verify the design of each of the plurality of components.

Additional advantages and features of the present invention will become apparent from the subsequent description and the appended claims, taken in conjunction with the accompanying drawings.

BRIEF DESCRIPTION OF THE DRAWINGS

FIG. 3 is a view of a portion of the schedule of FIG. 3.

DETAILED DESCRIPTION OF THE PREFERRED EMBODIMENT

Figure 1:
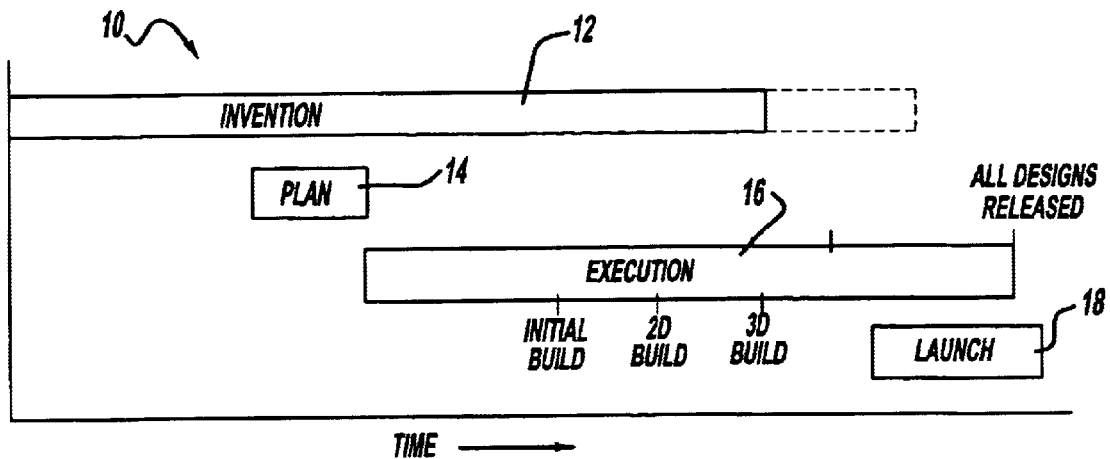
FIG. 1 is a schematic illustration of a schedule for a multi-phase project for the design and manufacture a multi-component assembly according to a prior art scheduling method.
Figure 2:
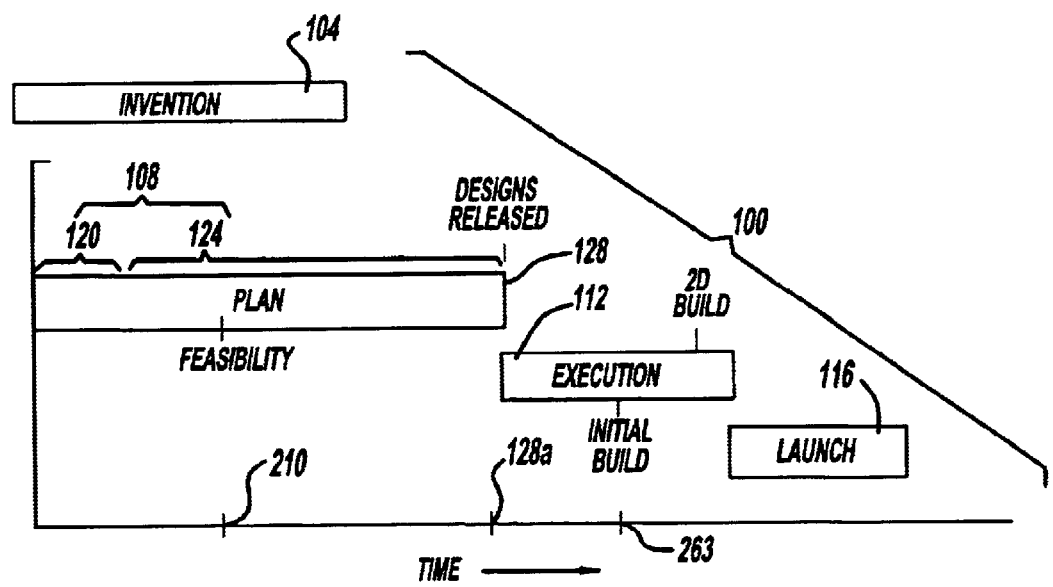
FIG. 2 is a schematic illustration of a schedule for a multi-phase project for the design and manufacture of a multi-component assembly according to the scheduling method of the present invention.

With reference to FIG. 2 of the drawings, a system for designing a multi-component assembly in accordance with the teachings of the present invention is schematically illustrated. System 100 is shown to generally include an off-line phase and three on-line phases which heavily emphasize project planning so as to produce a final design with as little reliance on iterative prototypes of the assembly as possible. Although the particular multi-component assembly referred to herein is an automotive vehicle, it will be understood that the teachings of the present invention have applicability to other types of devices and as such, will not be limited in scope to automotive vehicles.

System 100 is shown to include an off-line invention phase 104, the primary purpose of which is to identify and assess risks associated with inventions which would negatively impact program goals and objectives. A secondary purpose of the invention phase 104 is to ameliorate identified risks when possible. As used in the context of this phase, the term "invention" relates to a concept for one or more components, processes or materials that may be used in the design and/or manufacture of a vehicle. As such, an "invention" may relate to a stereo knob, a powertrain configuration, a method for installing piston kits or a ceramic coating. Inventions that have been evaluated and tested to ensure that they are solidly understood or that have been in use in other applications are referred to as "on-the-shelf inventions". All other inventions are classified as "new inventions".

The distinction between new and on-the-shelf inventions is drawn to expedite the process of identifying, assessing and ameliorating risks. Risks associated with on-the-shelf inventions are typically readily known and quantifiable. The number of risks associated with new inventions, as well as their magnitude, will vary depending upon a number of factors, including the technology of the invention, the maturity and stability of the invention, and the degree to which the invention has undergone critical scrutiny.

One manner in which risks may be ameliorated is to require plans to be in place to sufficiently develop and test out new technology prior to the official start of the program. This phase does not require complete testing, but does require sufficient testing to fully understand the process, failure modes and associated risks of the invention and its effect on other portions of the product or process. Smaller inventions, such as the style of a radio knob, for example, may be added fairly late in the process with little repercussions. However, the consequences of incorporating major inventions, such as a new powertrain or a new suspension, late in the process has the potential to negatively impact the timing, cost and/or quality of the project. Consequently, major new inventions are preferably not tied to a new product program as the intent is to separate out any major new inventions (i.e., develop new inventions in an off-line manner) unless these inventions are capable of being incorporated into the project with sufficient detail at an early stage of the project.

The three on-line phases of system 100 include a planning and development phase 108, an execution phase 112 and a launch phase 116. The planning and development phase 108 is divided into two elements which focus on planning activities undertaken at different levels. The emphasis of the activities associated with the planning and development phase 108 is to gather sufficient information to make good decisions and avoid iterative efforts associated with the rework and retest of designs.

Concept planning 120, the first element of the planning and development phase 108, is employed to define and clarify the high-level requirements of the program. These high-level requirements are typically based on a general direction from senior management and represent their preliminary vision of the new program. The high-level requirements of the program typically bound the program parameters and identify the significant challenges and opportunities facing the program.

A product and process planning element 124, the second element of the planning and development phase 108, is employed to provide a high confidence in the compatibility and synergy between all program objectives. The activities of the planning and development phase 108, particularly those of the second element, rely on analytical tools to provide an understanding of potential design and process alternatives. The reliance on analytical tools permits objective data to drive the decision making process and avoid iterative development associated with trial-and-error test methods.

One analytical tool, for example, may be a solids modeling or computer-aided-design software package that permits components to be designed and electronically assembled to verify their operation and performance. Use of a database containing manufacturing data, such as clearances required for sockets, wrenches, spindles, spot welding tools, etc. may also be employed to determine the capability with which the components may be assembled. Other commonly employed analytical tools include finite element analysis (FEA), failure mode and effects analysis (FMEA), stereo lithography, and other analytical tools.

Design choices are made from a systems perspective in terms of function, design, packaging, and business requirements with the goal being the creation of a single production process release 128. To achieve a single production process release 128, intense engineering analysis and problem solving is employed to establish broad feasibility and optimize the design. These efforts permit the design to be optimized when it is relatively inexpensive and performing without a need for iterative prototype builds.

With additional reference to FIG. 3, the product and process planning element 124 is shown in greater detail. In the particular example, the activities of the product and process planning element 124 are focused on a door assembly which includes as major components a regulator, a door trim panel, a door hinge assembly, a door panel, and a watershield. The product and process planning element 124 is illustrated as including a first portion 140 and a second portion 144.

The first portion 140 initially requires the potential design alternatives to be identified. This portion includes a preliminary investigation to establish broad feasibility through simulation and early development work for system and key component function, packaging, manufacturability and serviceability. Through analysis of trade-offs between preliminary customer requirements, functional objectives, marketing strategies, business objectives, packaging studies, manufacturing alternatives, and new or available technology, an appropriate number of product and processes alternatives are identified.

The first portion 140 next balances the business, product, process and design objectives of the program by refining the product, process and invention alternatives into a single theme that is both feasible and that satisfies the program goals and objectives. The first portion 140 typically requires that at least two themes and their required functionality evolve concurrently.

The selection process of the first portion 140 includes a detailed description of the vehicle function, performance, manufacturability, serviceability, as well as subjective assessment of vehicle styling appeal. Consequently, this portion is a continuous tradeoff analysis to optimize the design and drive decision making. The analysis emphasizes inventions that are sufficiently complete and ready to be integrated into the available design alternatives. The analysis also confirms that the risk associated with various inventions is sufficiently manageable.

The second portion 144 of the product and process planning element 124 is a detailed design phase which simultaneously culminates in a single production process release 128 wherein the designs of each of the plurality of components are released for production. During this portion of the project, all interior and exterior surfaces are released, supplier selection is completed, the tooling plan is finalized and the initial build strategy is initiated. Simultaneous culmination of the second portion 144 is a significant aspect of system 100 in that portions of the design activity are forestalled as long as possible to allow maximum flexibility in the design of components having a long design lead time and to minimize the risk of reworking designs to accommodate the subsequent development of other components. Problems that arise during the detailing of long design lead time components which affect the other components of the multi-component assembly are therefore more likely to be identified, and perhaps even solved, prior to the commencement of detailing activities on other components of the multi-component assembly. Consequently, the simultaneous culmination of the second portion 144 significantly diminishes the risk that a problem identified during the detailing of the components forming the multi-component assembly will negatively affect the design/detailing of other components.

The execution phase 112 is the first true integration of the vehicle as a complete unit and includes the construction of the first complete prototype vehicles. The elimination of multiple iterations of vehicle prototypes prior to the single product/process/design release eliminates "safety nets" and results in a narrowed focus which establishes a higher degree of feasibility and confidence. The emphasis of the execution phase 112 is placed on the verification of components, systems and vehicle designs, verification of the processes and the facilities and verification of the design and process. The primary tool for verification of the components, systems, designs, facilities and processes is a series of two essentially prototype vehicle builds.

The first prototype vehicle build utilizes production released components produced from prototype tooling in a pilot assembly facility. Individual components, sub-assemblies, assemblies and systems are verified to meet dimensional control plans, process capability, and functional and reliability objectives. While the first prototype vehicle build may reveal that some fine-tuning of the designs, processes or facilities may be necessary, it is emphasized that any efforts in these areas undertaken after the first prototype vehicle build are to be refinements, rather than supplemental development.

The second prototype vehicle build utilizes production released components produced from production tooling in the assembly plant where the vehicle is to be built on a production basis. This build verifies that the transition to production tooling has been successfully made and that any facilities-related characteristics associated with the assembly plant have been tested and verified. Facilities-related characteristics include, for example, the performance and operation of production-based material handling systems.

The launch phase 116 represents the shift of the project from prototype build to production build. Typically, this shift coincides with a shift in responsibilities from the design staff to the manufacturing staff. The shift is gradual, providing opportunities to refine the manufacturing process and resolve all product and process issues. Vehicles manufactured in the launch phase 116 are typically vehicles capable of being sold.

Figure 4A:
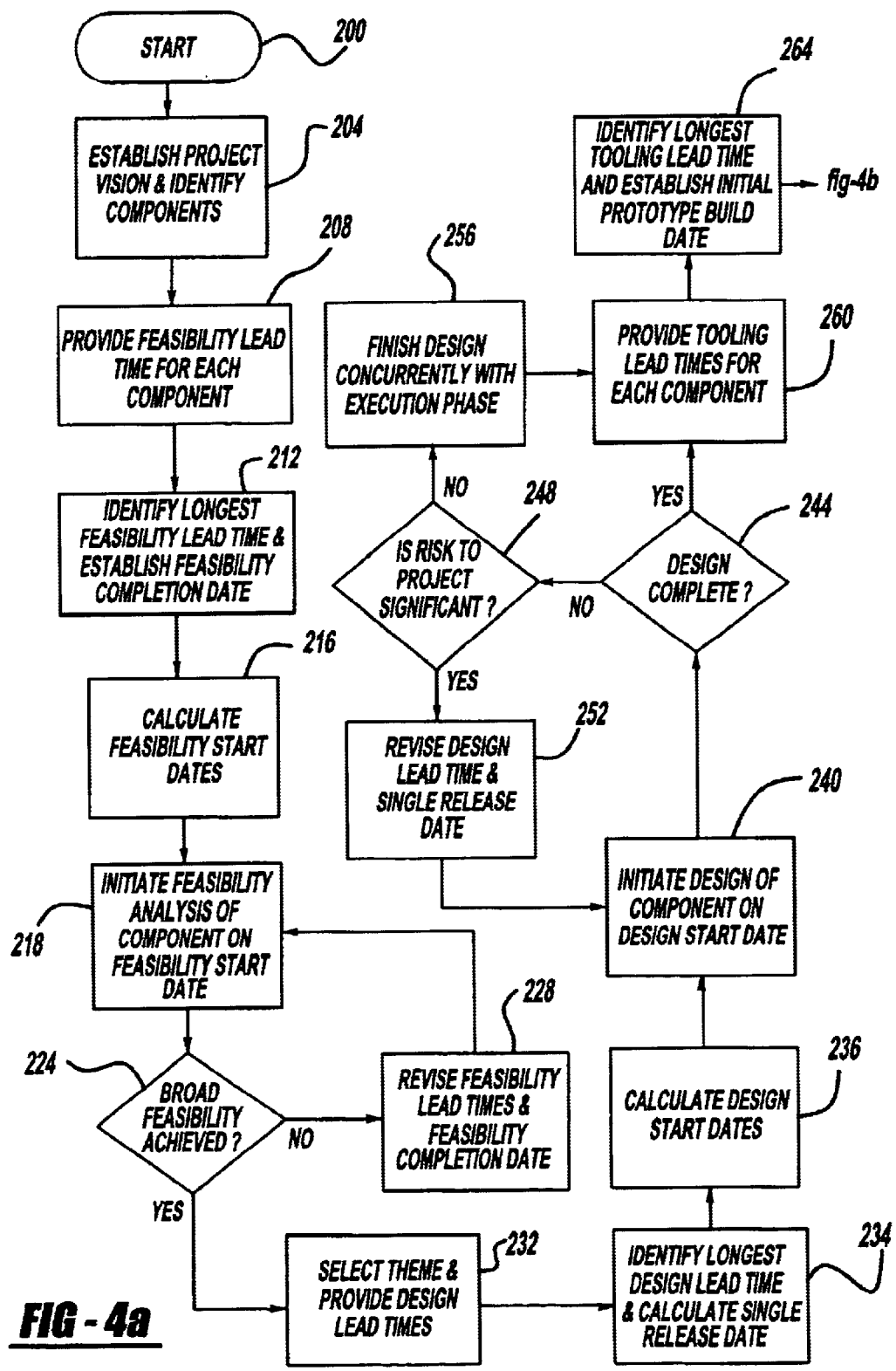
FIG. 4 is a schematic illustration of the scheduling method of the present invention in flowchart form.
Figure 4B:
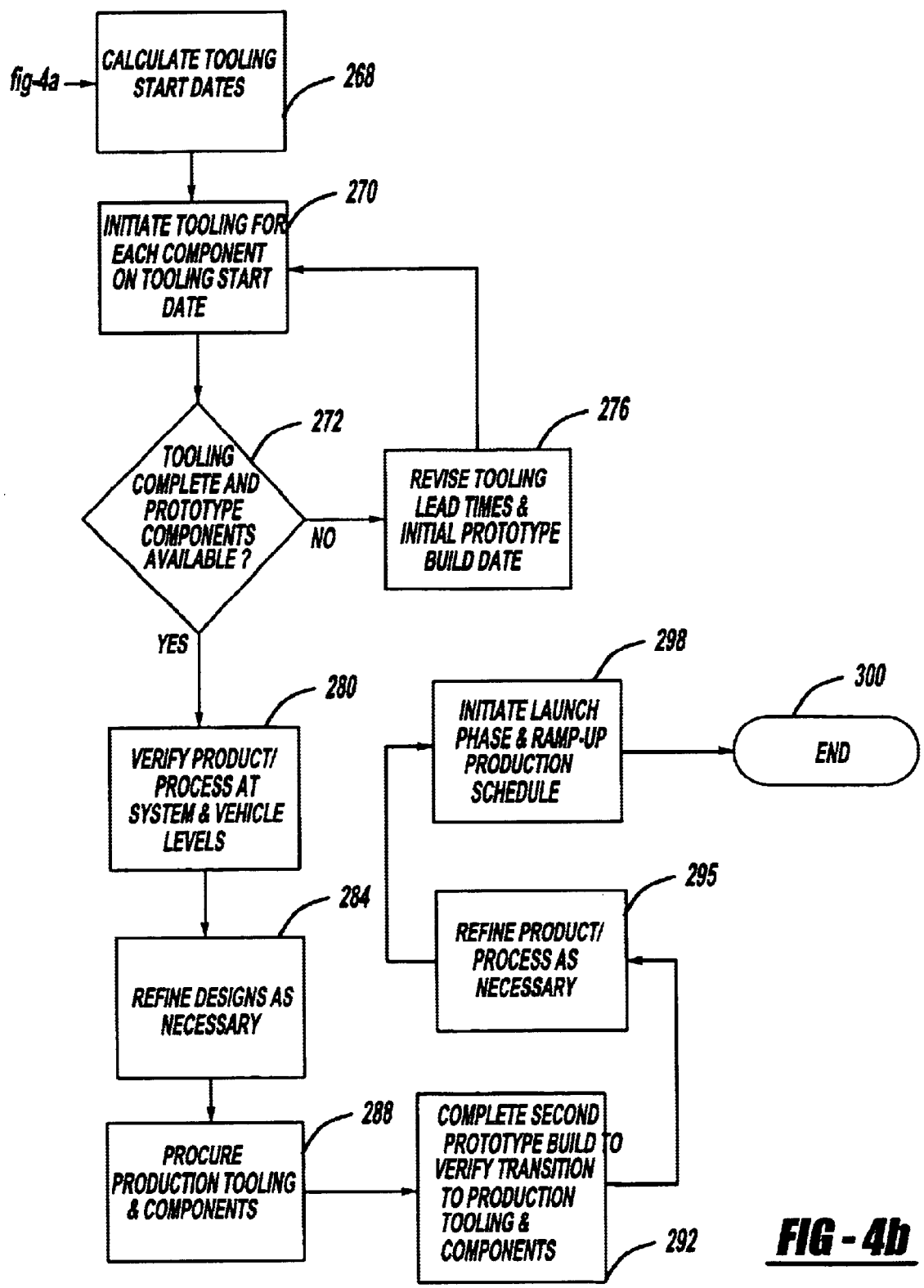

In FIG. 4, a method for scheduling a multi-phase project to design and manufacture a multi-component assembly is schematically illustrated in flowchart form. The methodology begins at bubble 200 and proceeds to block 204 where a project vision for the multi-component assembly is established and a plurality of components which at least partially comprise the multi-component assembly are identified. The methodology next proceeds to block 208.

In block 208, estimates of the lead time to analyze the feasibility of each of the plurality of components is provided. With additional reference to FIG. 3, the feasibility lead time 209 corresponds to the amount of time estimated to complete the first portion 140 of second element 124. The methodology proceeds to block 212 where the longest feasibility lead time 209a of FIG. 3 is identified. The longest feasibility lead time 209a is employed to establish a feasibility completion date 210. The methodology then proceeds to block 216.

In block 216, the methodology calculates feasibility start dates 211 for each of the plurality of components using the feasibility completion date 210 and the estimated feasibility lead times 209. The methodology then proceeds to block 218 where the feasibility analysis of each of the plurality of components is initiated on its respective feasibility start date 211. The feasibility analysis for a given component preferably requires that at least two project alternatives be identified and refined on a systems basis to maximize the function, design, packaging and business requirements of the component.

The methodology next proceeds to decision block 224 where the broad feasibility of the project as a whole is evaluated on the feasibility completion date 210. If the project does not have broad feasibility on the feasibility completion date 210, the methodology proceeds to block 228 where the estimates of the feasibility lead time 209 and feasibility completion date are revised. The methodology returns to block 218.

If the project does have broad feasibility on the feasibility completion date 210 in decision block 224, the methodology proceeds to block 232 where the alternatives identified and refined in block 218 are narrowed to a single project theme and estimates for the design lead time 219 of FIG. 3 for each of the plurality of components is provided. The design lead time 219 corresponds to the amount of time estimated to complete the second portion 144 of the second element 124. The methodology then proceeds to block 234 where the longest design lead time 219a is identified. The longest design lead time 219a is employed to establish a single production process release date 128a. The methodology then proceeds to block 236.

In block 236, the methodology calculates design start dates 221 for each of the plurality of components using the single production process release date 128a and the estimated design lead times 219. The methodology then proceeds to block 240 where the design and detailing of each of the plurality of components is initiated on its respective design start date 221. The methodology then proceeds to block 244 where the status of the design of each of the plurality of components is evaluated on the single production process release date 128a. If the designs of each of the plurality of components is not complete on the single production process release date 128a, the methodology proceeds to decision block 248 where the risks to the project are evaluated. If the design of one or more of the plurality of components is incomplete and presents a significant risk to the cost, timing or quality of the project, the methodology proceeds to block 252 where design lead times and the single release date are revised. The methodology then loops back to block 240.

Returning to decision block 248, if the cost, timing and quality of the project are not at significant risk from the incomplete status of the design of one or more of the plurality of components, the methodology proceeds to both block 256 and block 260 where the tasks associated with both blocks are undertaken concurrently. In block 256, the methodology permits the completion of any incomplete designs. In block 260, estimates for the tooling lead time 261 of FIG. 3 for each of the plurality of components are provided. The tooling lead time 261 corresponds to the amount of time estimated to procure prototype parts in the execution phase 112. The methodology then proceeds to block 264 where the longest tooling lead time 261a is identified. The longest tooling lead time 261a is employed to establish an initial prototype build date 263. The methodology then proceeds to block 268.

In block 268, the methodology calculates tooling start dates—for each of the plurality of components using the initial prototype build date 263 and the estimated tooling lead times 261. The methodology then proceeds to block 270 where the design and construction of the tooling for each of the plurality of components is initiated on their respective tooling start dates 265.

The methodology next proceeds to decision block 272 where the methodology determines whether components meeting the criteria of their respective designs have been produced. It is anticipated that these components will be fabricated from prototype or temporary tooling. However, there will be instances where due to a number of factors, including confidence in the design, where components will be fabricated from production tooling. If components are not available as of the initial prototype build date 263 in decision block 272, the methodology proceeds to block 276 where estimates for the tooling lead times 261 and the initial prototype build date 263 are revised. The methodology then loops back to block 268.

If components are available as of the initial prototype build date 263 in decision block 272, the methodology proceeds to block 280 where the initial prototype build is initiated and the products and process which are employed to form the multi-component assembly are verified on a both a systems level and a global level. The methodology next proceeds to block 284 where the designs of the components are refined as necessary. The methodology then proceeds to block 288 where production tooling and components are procured.

The methodology then proceeds to block 292 where a second prototype build is initiated to ensure that the transition to production tooling has been made satisfactorily. The methodology proceeds to block 296 where the design of the components and/or processes for making and/or assembling them are refined as necessary. The methodology then proceeds to the launch phase 116 (FIG. 2) in block 298 where production manufacturing is ramped up and all issues related to both the design of the components and the processes employed to make and assemble the components are closed. The methodology then terminates at bubble 300.

While the methodology of the present invention has been described thus far as having a time line which is determined on the basis of a series of lead times which are calculated through out the course of a project, those skilled in the art will appreciate that the invention, in its broader aspects, may be constructed somewhat differently. For example, estimates for the lead times associated with each phase or portion thereof may be provided before the initiation of the project or at an early stage of the project so as to "fix" deadlines and chart the progress of the project.

Figure 5:
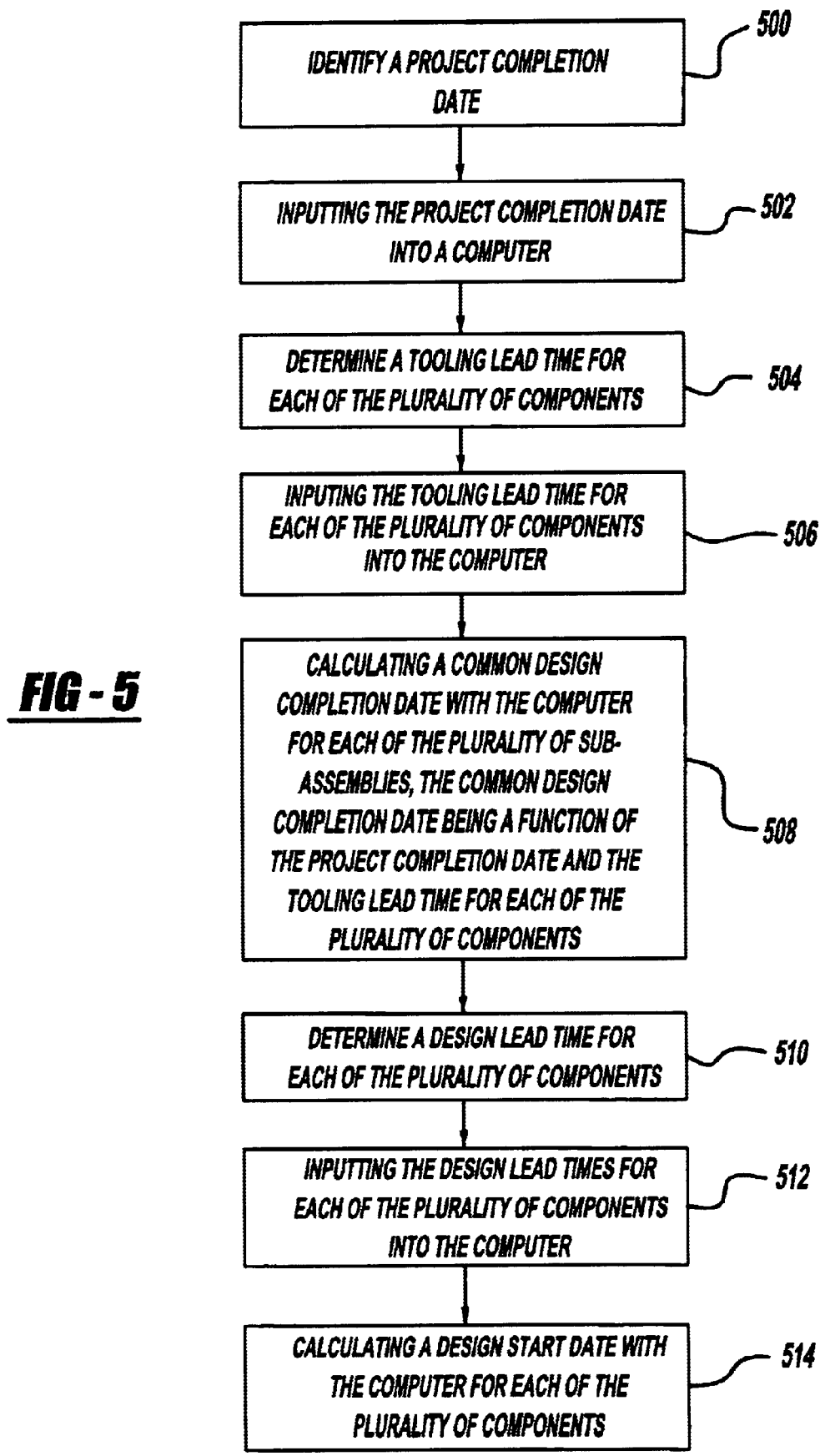
FIG. 5 is a schematic diagram illustrating the general steps of the scheduling method of the present invention.

Turning now to FIG. 5, a schematic diagram is illustrated identifying the general steps of a preferred method of the present invention. The method is particularly directed to a method of scheduling the design of a motor vehicle having a plurality of sub-assemblies.

In a first general step 500, a project completion date is identified.

In a second general step 502, the project completion date is inputted into a computer.

In a third general step 504, a tooling lead time for each of the plurality of components is determined.

In a fourth general step 506, the tooling lead times for each of the plurality of components are inputted into the computer.

In a fifth general step 508, a design completion date is calculated with the computer for each of the plurality of subassemblies. The design completion date is a function of the projection completion date and the tooling lead times for each of the plurality of components.

In a sixth general step 510, a design lead time is determined for each of the plurality of components.

In a seventh general step 512, the design lead times for each of the plurality of components is inputted into the computer.

In an eighth general step, a design start date is calculated with the computer for each of the plurality of components.

Figure 6:
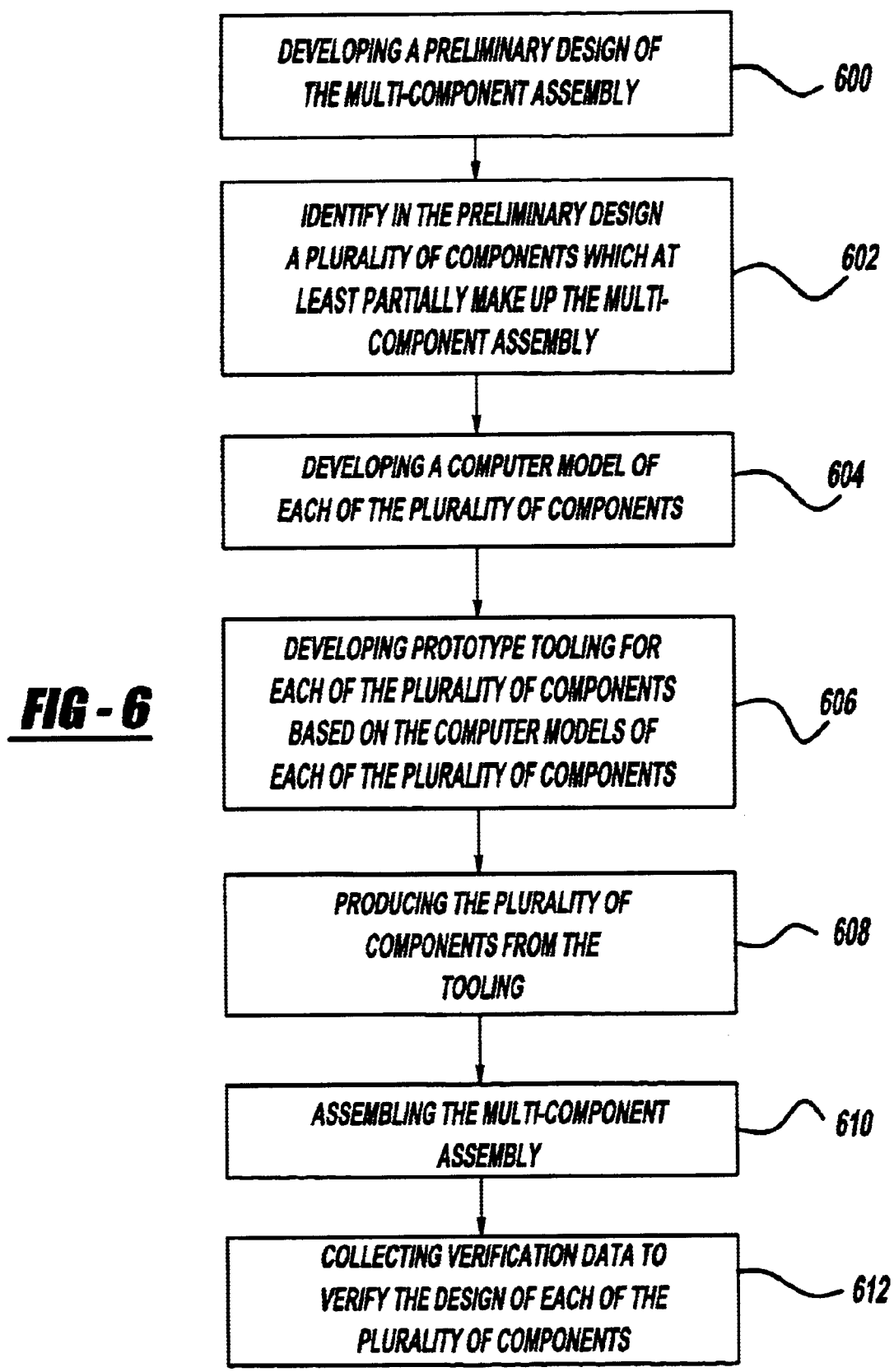
FIG. 6 is a schematic diagram illustrating the general steps of a method of developing a design for a multi-component assembly of the present invention.

The present invention is also directed to a method for developing a design for a multi-component assembly. With particular reference to the schematic diagram of FIG. 6, the method for developing a design for a multi-component assembly is shown to include a first general step 600 of developing a preliminary design of the multi-functional component assembly.

In a second general step 602, the method of developing a design for a multi-component assembly includes identifying in the preliminary design a plurality of components which at least partially make up the multi-functional component assembly.

In a third general step 604, the method of developing a design for a multi-component assembly of the present invention includes developing a computer model of each of the plurality of components.

In a fourth general step 606, the method of developing a design for a multi-component assembly of the present invention includes developing prototype tooling for each of the plurality of components based on the computer models of each of the plurality of components.

In a fifth general step 608, the method of developing a design for a multi-component assembly of the present invention includes producing the plurality of components from the tooling.

In a sixth general step 610, the method of developing a design for a multi-component assembly of the present invention includes assembling the multi-component assembly.

In a seventh general step 612, the method of developing a design for a multi-component assembly of the present invention includes collecting verification data to verify the design of each of the plurality of components.

Accordingly, while the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A method of scheduling a project to design and an assembly comprising a plurality of components, the method including:
   a. identifying a project completion date;
   b. determining a tooling lead time for each of the plurality of components;
   c. determining a common design completion date for each of the plurality of components, the common design completion date being a function of the project completion date and the tooling lead times for each of the plurality of components;
   d. determining a design lead time for each of the plurality of components; and
   e. determining a design start date for each of the plurality of components.

2. The method of claim 1, further including generating a plot of the tooling lead times and the design lead times for each of the plurality of components with a computer.

3. A method of scheduling the design of a motor vehicle having a plurality of components, the method including:

a. identifying a project completion date;
b. inputting the projection completion date into a computer;
c. determining a tooling lead time for each of the plurality of components;
d. inputting the tooling lead times for each of the plurality of components into the computer;
e. calculating a common design completion date with the computer for each of the plurality of components, the common design completion date being a function of the project completion date and the tooling lead times for each of the plurality of components;
f. determining a design lead time for each of the plurality of components;
g. inputting the design lead times for each of the plurality of components into the computer; and
h. calculating a design start date with the computer for each of the plurality of components.

4. The method of scheduling the design of a motor vehicle having a plurality of components of claim 3, further including generating a plot of the tooling lead times and the design lead times for each of the plurality of components with the computer.

5. The method of scheduling the design of a motor vehicle having a plurality of components of claim 3, further including:

a. calculating a feasibility completing date with the computer, the feasibility completing date being a function of the common design completing date and the design lead times for each of the plurality of components;

b. determining a feasibility lead time for each of the plurality of components;
c. inputting the feasibility lead times for each of the plurality of components into the computer; and
d. calculating a feasibility start date with the computer for each of the plurality of components.

6. A method for developing a design for a multi-component assembly, the method comprising:

a. developing a preliminary design of the multi-component assembly;
b. identifying in the preliminary design a plurality of components which at least partially make up the multi-component assembly;
c. developing a computer model of each of the plurality of components;
d. developing prototype tooling for each of the plurality of components based on the computer models of each of the plurality of components;
e. producing the plurality of components from the tooling;
f. assembling the multi-component assembly; and
g. collecting verification data to verify the design of each of the plurality of components.

7. The method of claim 6, further comprising developing production tooling based on the verification data.

* * * * *